US009185738B2

(12) United States Patent
Suzuki et al.

(10) Patent No.: US 9,185,738 B2
(45) Date of Patent: Nov. 10, 2015

(54) DISCONTINUOUS RECEPTION START OFFSET COORDINATED WITH SEMI-PERSISTENT SCHEDULING SYSTEM AND METHOD

(71) Applicant: BlackBerry Limited, Waterloo (CA)

(72) Inventors: Takashi Suzuki, Ichikawa (JP); Richard Charles Burbridge, Hook (GB); Zhijun Cai, Ashburn, VA (US); Andrew Mark Earnshaw, Kanata (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 14/280,273

(22) Filed: May 16, 2014

(65) Prior Publication Data

US 2014/0247763 A1 Sep. 4, 2014

Related U.S. Application Data

(63) Continuation of application No. 13/618,198, filed on Sep. 14, 2012, now Pat. No. 8,730,902, which is a continuation of application No. 12/698,514, filed on Feb. 2, 2010, now Pat. No. 8,295,240.

(60) Provisional application No. 61/149,226, filed on Feb. 2, 2009, provisional application No. 61/162,594, filed on Mar. 23, 2009, provisional application No. 61/169,645, filed on Apr. 15, 2009, provisional application No. 61/172,979, filed on Apr. 27, 2009.

(51) Int. Cl.
*G08C 17/00* (2006.01)
*H04W 76/04* (2009.01)
*H04W 72/04* (2009.01)

(52) U.S. Cl.
CPC .......... *H04W 76/048* (2013.01); *H04W 72/042* (2013.01)

(58) Field of Classification Search
USPC ......... 370/329, 311, 338, 341, 468, 349, 389, 370/471, 395.3, 395.4, 465, 395.41; 455/450; 711/167, 154
See application file for complete search history.

(56) References Cited

U.S. PATENT DOCUMENTS

| 7,760,676 B2 | 7/2010 | Demirhan et al. |
| 8,121,632 B2 | 2/2012 | Sambhwani et al. |
| 8,351,974 B2 * | 1/2013 | Ahn et al. ..................... 455/522 |

FOREIGN PATENT DOCUMENTS

| WO | 2007073118 A1 | 6/2007 |
| WO | 2008069950 A2 | 6/2008 |

OTHER PUBLICATIONS

Suzuki, Takashi, et al.; U.S. Appl. No. 12/698,514, filed Feb. 2, 2010; Title: Discontinuous Reception Start Offset Coordinated with Semi-Persistent Scheduling System and Method.
(Continued)

*Primary Examiner* — Chi H Pham
*Assistant Examiner* — Alexander O Boakye
(74) *Attorney, Agent, or Firm* — Conley Rose, P.C.; J. Robert Brown, Jr.

(57) ABSTRACT

An apparatus and method are provided for configuring a user agent to receive semi-persistent scheduling (SPS) transmissions independent of the user agent monitoring a physical downlink control channel (PDCCH). Also provided are an apparatus and method for configuring a user agent to monitor a PDCCH in a subframe to which one of a downlink assignment or an uplink grant is configured.

20 Claims, 6 Drawing Sheets

(56) References Cited

OTHER PUBLICATIONS

Suzuki, Takashi, et al.; U.S. Appl. No. 13/618,198, filed Sep. 14, 2012; Title: Discontinuous Reception Start Offset Coordinated with Semi-Persistent Scheduling System and Method.
3GPP TS 24.008 V8.4.0; 3rd Generation Partnership Project; Technical Specification Group Core Network and Terminals; Mobile Radio Interface Layer 3 Specification; Core Network Protocols; Stage 3; Release 8; Dec. 2008; 571 pages.
3GPP TS 25.331 V8.4.0; 3rd Generation Partnership Project; Technical Specification Group Radio Access Network; Radio Resource Control (RRC); Protocol Specification; Release 8; Sep. 2008; 1543 pages.
3GPP TS 36.211 V8.5.0; 3rd Generation Partnership Project; Technical Specification Group Radio Access Network; Evolved Universal Terrestrial Radio Access (E-UTRA); Physical Channels and Modulation; Release 8; Dec. 2008; 82 pages.
3GPP TS 36.304 V9.1.0; 3rd Generation Partnership Project; Technical Specification Group Radio Access Network; Evolved Universal Terrestrial Radio Access (E-UTRA); User Equipment (UE) Procedures in Idle Mode; Release 9; Dec. 2009; 31 pages.
3GPP TS 36.321 V8.4.0; 3rd Generation Partnership Project; Technical Specification Group Radio Access Network; Evolved Universal Terrestrial Radio Access (E-UTRA) Medium Access Control (MAC) Protocol Specification; Release 8; Dec. 2008; 43 pages.
3GPP TS 36.321 V8.5.0; 3rd Generation Partnership Project; Technical Specification Group Radio Access Network; Evolved Universal Terrestrial Radio Access (E-UTRA) Medium Access Control (MAC) Protocol Specification; Release 8; Mar. 2009; 46 pages.
3GPP TS 36.331 V8.4.0; 3rd Generation Partnership Project; Technical Specification Group Radio Access Network; Evolved Universal Terrestrial Radio Access (E-UTRA) Radio Resource Control (RRC); Protocol Specification; Release 8; Dec. 2008; 198 pages.
3GPP TSG-RAN2 Meeting #64; "Clarification of DRX Active Time"; R2-086815; Prague, Czech Republic; Nov. 10-14, 2008; 6 pages.
3GPP TSG-RAN2 #65bis; " DRX and SPS Alignment in REL9"; R2-09aaaa; Seoul, Korea; Mar. 23-27, 2009; 4 pages.
3GPP TSG-RAN WG2 Meeting #64-bis; "RRC Processing Delay"; R2-090820; Ljubljana, Country; Jan. 12-16, 2009; 3 pages.
3GPP TSG-RAN WG2 Meeting #63bis; "Signaling of DRX Start Offse"t; R2-085387; Prague, Czech Republic; Sep. 29-Oct. 3, 2008; 8 pages.
3GPP TSG-RAN WG2 #64bis; "Consideration of DRX and SPS Alignment"; R2-090369; Ljubljana, Slovenia; Jan. 12-16, 2009; 6 pages.
3GPP TSG-RAN2#65; "Consideration of DRX and SPS Alignment"; R2-091481; Athens, Greece; Feb. 9-13, 2009; 4 pages.
3GPP TSG-RAN2#66bis; "DRX and SPS Alignment in REL9"; R2-093731; Los Angeles, U.S.A.; Jun. 29-Jul. 3, 2009; 4 pages.
Office Action dated Mar. 26, 2012; U.S. Appl. No. 12/698,514, filed Feb. 2, 2010; 11 pages.
Notice of Allowance dated Aug. 17, 2012; U.S. Appl. No. 12/698,514, filed Feb. 2, 2010; 10 pages.
Office Action dated Sep. 12, 2013; U.S. Appl. No. 13/618,198, filed Sep. 14, 2012; 11 pages.
Notice of Allowance dated Jan. 7, 2014; U.S. Appl. No. 13/618,198, filed Sep. 14, 2012; 10 pages.
European Extended Search Report; Application No. 10152444.5; May 19, 2010; 15 pages.
European Examination Report; Application No. 10152444.5; Mar. 14, 2011; 9 pages.
European Examination Report; Application No. 10152444.5; Dec. 21, 2011; 5 pages.
European Examination Report; Application No. 10152444.5; Jun. 11, 2012; 5 pages.

\* cited by examiner

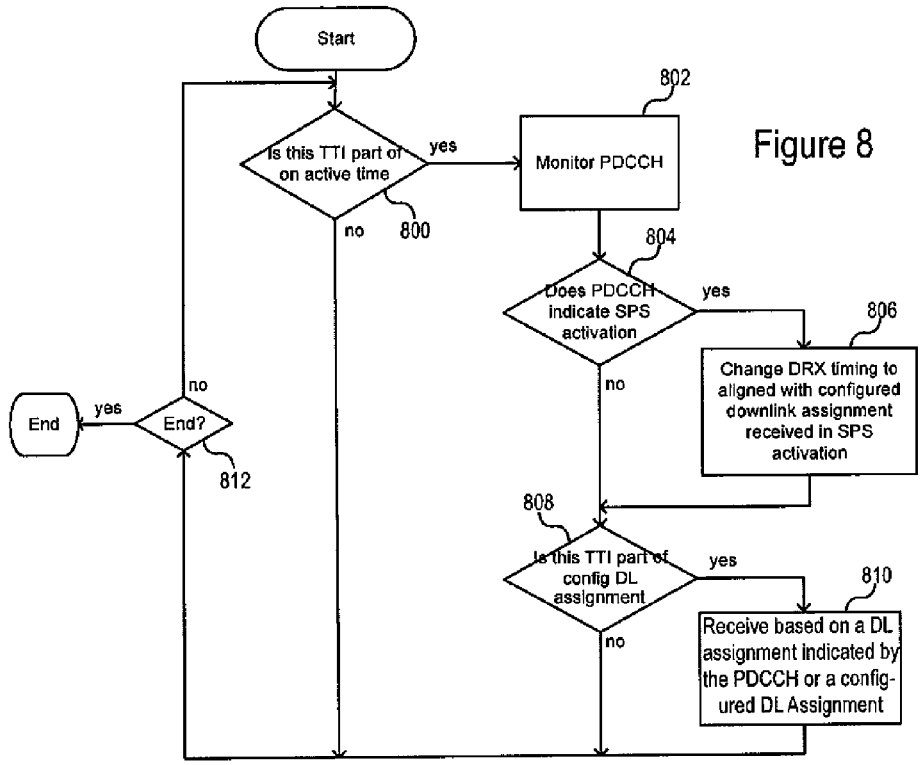
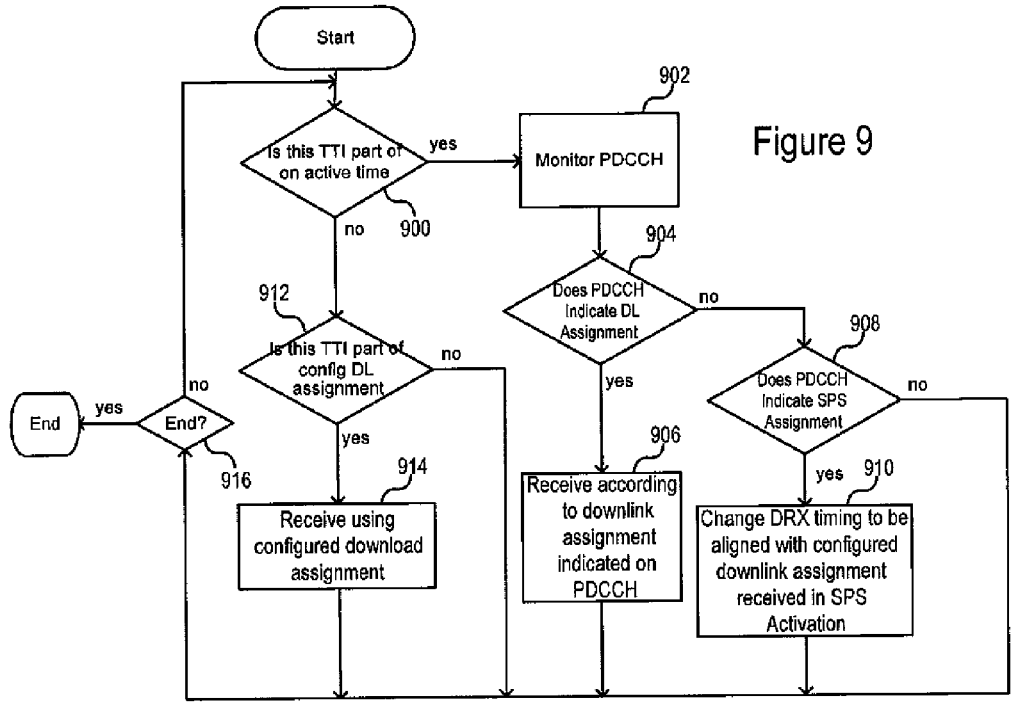

DISCONTINUOUS RECEPTION START OFFSET COORDINATED WITH SEMI-PERSISTENT SCHEDULING SYSTEM AND METHOD

CROSS-REFERENCE TO RELATED APPLICATIONS

This application is a continuation of U.S. patent application Ser. No. 13/618,198 filed Sep. 14, 2012 by Takashi Suzuki, et al. entitled, "Discontinuous Reception Start Offset Coordinated with Semi-Persistent Scheduling System and Method" which is a continuation of U.S. Pat. No. 8,295,240 issued on Oct. 23, 2012 entitled, "Discontinuous Reception Start Offset Coordinated with Semi-Persistent Scheduling System and Method" which claims priority to U.S. Provisional Application No. 61/149,226 filed Feb. 2, 2009; U.S. Provisional Application No. 61/162,594 filed Mar. 23, 2009; U.S. Provisional Application No. 61/169,645 filed Apr. 15, 2009; and U.S. Provisional Application No. 61/172,979 filed Apr. 27, 2009, which are incorporated by reference herein as if reproduced in their entirety.

BACKGROUND

As used herein, the terms "user agent" and "UA" might in some cases refer to mobile devices such as mobile telephones, personal digital assistants, handheld or laptop computers, and similar devices that have telecommunications capabilities. Such a UA might consist of a UA and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UA might consist of the device itself without such a module. In other cases, the term "UA" might refer to devices that have similar capabilities but that are not transportable, such as desktop computers, set-top boxes, or network appliances. The term "UA" can also refer to any hardware or software component that can terminate a communication session for a user. Also, the terms "user agent," "UA," "user equipment," "UE," "user device" and "user node" might be used synonymously herein.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as long-term evolution (LTE). For example, an LTE system might include an enhanced node B (eNB), a wireless access point, or a similar component rather than a traditional base station. As used herein, the term "access node" will refer to any component of the wireless network, such as a traditional base station, a wireless access point, or an LTE eNB, that creates a geographical area of reception and transmission coverage allowing a UA or a relay node to access other components in a telecommunications system. In this document, the term "access node" may comprise a plurality of hardware and software.

An LTE system can include protocols such as a Radio Resource Control (RRC) protocol, which is responsible for the assignment, configuration, and release of radio resources between a UA and an access node or relay node or other LTE equipment. The RRC protocol is described in detail in the Third Generation Partnership Project (3GPP) Technical Specification (TS) 36.331. According to the RRC protocol, the two basic RRC modes for a UA are defined as "idle mode" and "connected mode." During the connected mode or state, the UA may exchange signals with the network and perform other related operations, while during the idle mode or state, the UA may shut down at least some of its connected mode operations. Idle and connected mode behaviors are described in detail in 3GPP TS 36.304 and TS 36.331.

The signals that carry data between UAs, relay nodes, and access nodes can have frequency, time, and coding parameters and other characteristics that might be specified by a network node. A connection between any of these elements that has a specific set of such characteristics can be referred to as a resource. The terms "resource," "communications connection," "channel," and "communications link" might be used synonymously herein. A network node typically establishes a different resource for each UA or other network node with which it is communicating at any particular time.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 8 is a flowchart illustrating a method of adjusting DRX timing and receiving using a configured DL assignment, according to an embodiment of the disclosure.

FIG. 9 is a flowchart illustrating a method of adjusting DRX timing and receiving using a configured DL assignment, according to an embodiment of the disclosure.

DETAILED DESCRIPTION

Figure 1:
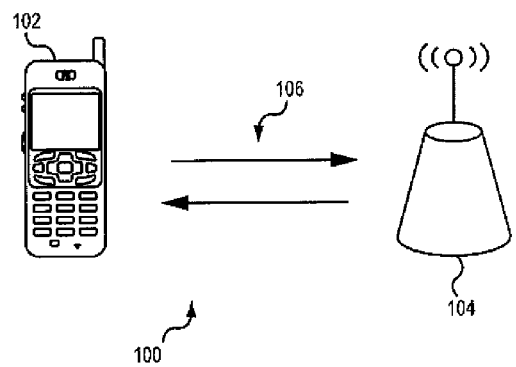
FIG. 1 is a block diagram of a mobile communications system suitable for implementing the several embodiments of the present disclosure.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As used herein, the following acronyms have the following definitions.

"Active time" refers to a time when a UA is monitoring the PDCCH.

"C-RNTI" is defined as "cell radio network temporary identifier," which refers to an identifier for a UA.

"DL-SCH" is defined as "downlink shared channel."

"DRX" is defined as "discontinuous reception," in which a UA attempts to receive data and/or resources only during certain times.

"eNB" is defined as "enhanced node B," which is an example of one type of access node or device used in a radio access network (RAN) to aid in establishing communication between a UA and a Core Network (CN).

"HARQ" is defined as "hybrid automatic repeat request," which refers to an error control method.

"LTE" is defined as "long term evolution," which refers to a newer system of high speed mobile communications and infrastructure standardized by 3GPP.

"On duration time" or "on duration" refers to a time, which recurs periodically, when the UA monitors the PDCCH.

"PDCCH" is defined as "physical downlink control channel," which refers to a channel over which a UA can be allocated uplink and/or downlink resources, and over which SPS transmission can be activated or released.

"RTT" is defined as "round trip time."

"SPS" is defined as "semi-persistent scheduling," which refers to a mechanism or technique whereby a UA can be configured with a periodically recurring resource for downlink and/or uplink initial transmission without that resource being indicated on the PDCCH every time.

"TS" is defined as "technical specifications," which are mobile communications specifications called-for by the 3GPP ($3^{rd}$ generation partnership project) for implementing an LTE system.

"TTI" is defined as "transmission time interval," which refers to a period of time between instances when a transport block is made available to the physical layer for transmission, or between instances when a transport block may be received from the physical layer; a TTI may be referred-to as, for example, a subframe.

Other acronyms that may appear herein are used and defined according to the technical specifications of the 3GPP standards. As used herein, terms within quotation marks refer to a name of an object or process.

The embodiments described herein relate to an issue that arises with regard to behavior of a UA during simultaneous operation of SPS and DRX. As described further below with respect to FIG. 2, the current specifications (TS36.321 version 8.5.0) describe that the UA does not receive using a configured downlink assignment outside of the active time of DRX. According to the specification, as the UA cannot receive a configured downlink assignment outside of the active time, then configured downlink assignments would have to be configured in a subframe when the "on duration timer" is running. This arrangement ensures reception of configured downlink assignments, even though the configuration is allowed whenever the UA monitors the PDCCH. However, because the active time duration depends on the activity of the UA, the UA may not be monitoring the PDCCH. Hence, the UA may fail to receive the downlink assignment, which is configured outside of the "on duration" period. As a result, scheduling flexibility may be limited, which may lead to less efficient resource utilization. Additionally, the network may attempt to change the timing of the downlink assignment configuration outside of the "on duration" time in order to re-distribute the load on resources, or to align with new talk spurt time. These issues are further described with respect to FIG. 2.

This disclosure may address, in some embodiments, the issues described above. Several alternative embodiments are also provided herein. In one embodiment, the UA uses a configured downlink assignment independent of its PDCCH monitoring. Alternatively, the UA monitors the PDCCH in a sub-frame to which a downlink assignment is configured. In these two alternative embodiments, the UA receives its SPS transmissions even where the SPS transmissions do not align with the "on duration" time. Thus, the UA has an extra occasion to be active, and the UA ultimately receives more transmissions.

In another embodiment, the "on duration timer" is started or restarted when the starting condition is satisfied, thereby ensuring correct DRX operation when the radio resource control (RRC) configures or reconfigures the DRX start offset. In some contexts, the DRX start offset may be referred to as the DRX Start Offset. In yet another embodiment, the UA adjusts the DRX start offset when a downlink assignment is configured or reconfigured. In another alternative embodiment, the UA detects its SPS-RNTI during the active time, when indicated by the network for a preconfigured duration; otherwise, the UA detects its SPS-RNTI during the "on duration" period only. Thus, the embodiments provide for a user agent enabled to receive an SPS transmission using a configured downlink assignment independent of the user agent monitoring a physical downlink control channel (PDCCH).

FIG. 1 is a block diagram of a mobile communications system 100 suitable for implementing the several embodiments of the present disclosure. Mobile communications system 100 includes UA 102 and network 104. UA 102 communicates with network 104, as shown by arrows 106. UA 102 can also communicate with other telecommunications devices using network 104.

UA 102 can take many forms, as described above. Likewise, network 104 can include one or more devices and/or software used in telecommunication systems. In an embodiment, network 104 represents an LTE system, though network 104 could be any number of devices of different networks. Network 104 can also include a radio access network (RAN), relays, eNBs, and many other devices for implementing a telecommunications network.

For purposes of the embodiments described herein, an "uplink" is a communication that originates at the UA 102 and is directed towards the network 104. Likewise, a "downlink" is a communication that originates at the network 104 and is directed at the UA 102.

Figure 2:
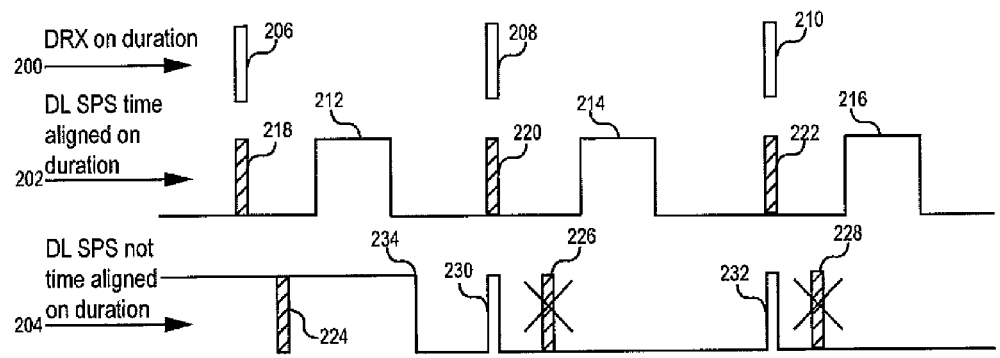
FIG. 2 is a timing diagram illustrating simultaneous operation of semi-persistent scheduling (SPS) and discontinuous reception (DRX) in a user agent (UA), according to the current state of the 3GPP specifications.

FIG. 2 is a timing diagram illustrating simultaneous operation of semi-persistent scheduling (SPS) and discontinuous reception (DRX) in a user agent (UA), according to the current state of the 3GPP specifications. The aspects of FIG. 2 can be implemented in a UA, such as UA 102 of FIG. 1.

Part of the operation of a UA involves receipt of communications resources from a network, such as network 104 of FIG. 1. In an embodiment, a UA receives such resources over a physical downlink control channel (PDCCH) that is transmitted by the network. One method for a UA to more efficiently receive resources over the PDCCH is to use semi-persistent scheduling (SPS).

SPS is a technique in which the UA is configured with a resource on a semi-persistent basis for downlink and/or uplink initial transmissions without that resource being indicated on the PDCCH every time a resource is to be used. Within the 3GPP specifications, as well as for the purposes herein, the periodically recurring resource can be referred to as "configured downlink assignments" in the case of downlinks, and "configured uplink grants" in the case of uplinks.

In order to use the SPS mechanism, the access node sends the UA an SPS activation command which includes the configured downlink assignment or the configured uplink grant. The SPS activation command is sent to the UA on the PDCCH, and therefore can only be sent to the UA during the active time when the UA is monitoring the PDCCH. The SPS activation command may be sent to the UA using an SPS-RNTI, which is an SPS specific identifier for that UA. Once SPS is activated, the configured downlink assignment and/or configured uplink grant is used by the UA until it is released, for example, by reception of an SPS release command sent to the UA on the PDCCH. The timing of the configured downlink assignments and/or configured uplink grants is based in part on the time when the SPS activation command is received by the UA. In one example, the configured downlink assignment and/or configured uplink grant recurs periodically from the time of reception of the SPS activation.

To conserve battery power, the UA may be configured to avoid continuous monitoring of the PDCCH. In particular, the UA will monitor the PDCCH only at given subframes. This type of monitoring may occur during discontinuous reception (DRX), for example, to conserve battery power. During DRX the subframes in which the UA monitors the PDCCH, referred to as the "on duration," recur periodically. The timing of the "on durations" may be configured by the access node, for example, by sending a parameter such as "DRX start offset" to the UA. Different UAs may be configured with different values of "DRX start offset" in order to distribute the UA's "on durations" in time.

As mentioned above, an issue that arises with regard to behavior of a UA during simultaneous operation of SPS and DRX. The specifications (TS36.321 version 8.5.0) describe that the UA does not receive using a configured downlink assignment outside of the active time of DRX. The current specification, such as at section 5.3.1, currently calls for a particular procedure with regard to reception using configured downlink assignment.

In particular, the downlink assignments transmitted on the PDCCH indicate whether there is a transmission on the DL-SCH for a particular UA, and also provides the relevant HARQ information. When the UA has a C-RNTI, Semi-Persistent Scheduling C-RNTI, or Temporary C-RNTI, the UA, for each TTI during which it monitors PDCCH, takes one of several possible alternative actions. If a downlink assignment for a TTI has been received on the PDCCH for the UA's C-RNTI, or Temporary C-RNTI, then a particular action is taken with regard to processing a downlink assignment. Otherwise, if a downlink assignment for this TTI has been received on the PDCCH for the UA's Semi-Persistent Scheduling C-RNTI, then processing of SPS release, activation, and other events may occur. If a downlink assignment for this TTI has been configured, then the physical layer is instructed to receive, in this TTI, transport(s) block on the DL-SCH according to the configured downlink assignment and to deliver it to the HARQ entity.

Thus, the UA does not receive using a configured downlink assignment outside of the active time when the UA monitors the PDCCH. However, the access node may choose to activate SPS at any time during the active time. Because the active time duration depends on the activity of the UA, the UA may not be monitoring the PDCCH, and hence may fail to receive using the configured downlink assignment if monitoring needs to occur outside of the "on duration" period. This result is undesirable, because data transmissions sent using the configured downlink assignment will not be received, scheduling flexibility is limited, and resource utilization is less efficient. FIG. 2 describes this situation in more detail.

Generally, FIG. 2 represents events that occur as time moves forward in the direction indicated by arrows 200, 202, and 204. The times along arrow 200, arrow 202, and arrow 204 are aligned with each other. Arrow 200 represents the occurrences of DRX "on duration" events. Arrow 202 represents UA activity for the case in which downlink SPS is time aligned with the DRX "on duration." Arrow 204 represents UA activity for the case in which downlink SPS is not time aligned with the DRX "on duration."

Thus, DRX "on duration" block 206, DRX "on duration" block 208, and DRX "on duration" block 210 represent times at which the DRX "on duration timer" is on. In other words, each of blocks 206, 208, and 210 represent times during which a UA is scheduled to receive resources and/or monitor the PDCCH.

In the case illustrated at arrow 202, during which the downlink (DL) SPS is time aligned to the "on duration," active time block 212, active time block 214, and active time block 216, are provided in order to represent UA active time for receiving potential retransmission. DL SPS transmission block 218, DL SPS transmission block 220, and DL SPS transmission block 222 represent times of the configured DL assignments.

Arrow 202 shows that DL SPS transmission block 218 aligns with DRX "on duration" block 206, DL SPS transmission block 220 aligns with DRX "on duration" block 208, and DL SPS transmission block 222 aligns with DRX "on duration" block 210. Thus, the configured DL assignments are aligned to the DRX "on durations." During these times, the UA receives SPS transmissions using the configured DL assignments, represented at DL SPS transmission blocks 218, 220, and 222.

Additionally, the UA starts the DRX retransmission timer. Starting the DRX retransmission timer means that the UA will be monitoring the PDCCH for a configured duration, in order to receive a potential retransmission after one round trip time. Active time block 212, active time block 214, and active time block 216 show the UA active time for receiving potential retransmission. Thus, in this case, the DL SPS operates correctly.

However in the case illustrated at arrow 204, DL SPS transmission block 224 does not align with DRX "on duration" block 206, DL SPS transmission block 226 does not align with DRX "on duration" block 208, and DL SPS transmission block 228 does not align with DRX "on duration"

block 210. Thus, the configured DL assignments are not aligned to the DRX "on durations." For these blocks to be aligned, DL SPS transmission block 226 should have been located at time block 230, and DL SPS transmission block 228 should have been located at time block 232.

In the current specifications (TS36.321 version 8.5.0), nothing restricts the timing of when the network device (such as an eNB) can activate DL SPS. The only requirement is that the UA be in active time, and therefore monitoring the PDCCH, in order to receive the SPS activation command which configures downlink assignment. However, the network device can choose to extend the active time in order to activate SPS at any time. Still further, when the DRX inactivity timer expires, such as at time instant 234 in FIG. 2, and the UA starts a DRX operation, the UA may monitor the PDCCH only during "on duration" times. As a result, reception of DL SPS transmissions will cease to operate correctly, again as indicated at time block 226 and time block 228.

Based on the specifications in section 5.3.1 of TS36.321 version 8.5.0, the UA will not process the configured DL assignment in a subframe that is not part of active time, the active time including a period of DRX "on duration" time. Thus, in FIG. 2, the UA will receive SPS transmissions using the configured downlink assignment 224 as it occurs during active time. However, the UA will not receive using the configured downlink assignments at time blocks 226 and 228, as they occur outside of active time. As a result, the SPS transmission will not be received. This result may be inefficient and undesirable.

Furthermore, section 5.7 of TS36.321 version 8.5.0 specifies that the UA will not start the HARQ RTT in a frame that is not part of active time. As a result, the UA may not be in active time and hence may not receive potential retransmissions for downlink assignments configured outside of "on duration" time, which may cause further problems with the DL SPS operation.

The present disclosure provides several embodiments related to these issues. For example, for efficient radio resource utilization, one embodiment provides that the UA may receive using a configured DL assignment independent of PDCCH monitoring. In another embodiment, the UA may monitor the PDCCH in a sub-frame in which DL assignment is configured. In still another embodiment, the DRX start offset can be adjusted to align with the configured resources. These and other embodiments are described in more detail below.

Figure 3:
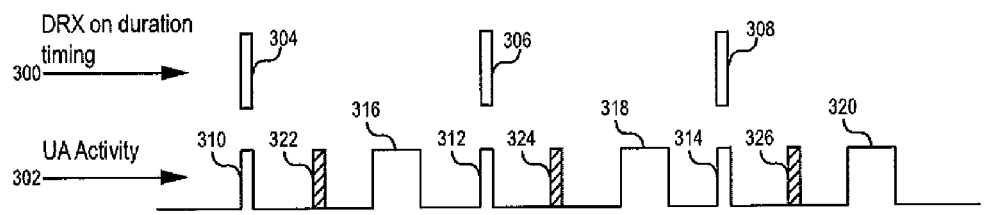
FIG. 3 is a timing diagram illustrating simultaneous operation of SPS and DRX in a UA, according to an embodiment of the disclosure.

FIG. 3 is a timing diagram illustrating simultaneous operation of SPS and DRX in a UA, according to an embodiment of the disclosure. The procedure shown in the timing diagram of FIG. 3 can be implemented in a UA, such as UA 102 of FIG. 1. Time moves along the direction shown by arrows 300 and 302, with times aligning along the various points of the timing diagrams.

In the timing diagram of FIG. 3, the UA receives SPS transmissions using a configured downlink assignment that is independent of active time. Thus, according to one embodiment, the UA may receive its SPS transmissions even if the assignment does not align with the "on duration" time. Accordingly, the UA has an extra occasion to be active, and the UA ultimately receives more transmissions. This technique can also be implemented using the timing diagram shown in FIG. 4; however, the timing diagram with respect to FIG. 3 is described first.

Arrow 300 shows the DRX "on duration" timing. Thus, each of time blocks 304, 306, and 308 show times that the DRX is "on duration." Note that the SPS and DRX timings are not aligned.

Arrow 302 shows the UA activity. Time blocks 310, 312, and 314 show the active times during the DRX "on duration." Time blocks 316, 318, and 320 show the active time for potential retransmissions. At time blocks 322, 324, and 326, the UA is required to receive SPS transmissions using the configured DL assignment, even when not in active time. In this manner, the issues described with respect to FIG. 2 can be handled appropriately. Additionally, in an embodiment, the DRX retransmission timer can be started to allow for potential retransmission.

Accordingly, the UA uses a configured DL assignment to receive SPS transmissions independent of the UA monitoring the PDCCH. This embodiment provides for extending section 5.3.1 of TS36.321 version 8.5.0, for example, such that when the UA has a C-RNTI, Semi-Persistent Scheduling C-RNTI, or Temporary C-RNTI, the UA shall, for each TTI during which it monitors PDCCH or to which a downlink assignment (or uplink grant) is configured, perform the specified procedures. Additionally, section 5.7 of TS36.321 version 8.5.0 might be modified according to one embodiment such that, during the Active Time and in a subframe to which a downlink assignment is configured, the UA will monitor the PDCCH and follow the other specified procedures.

Figure 4:
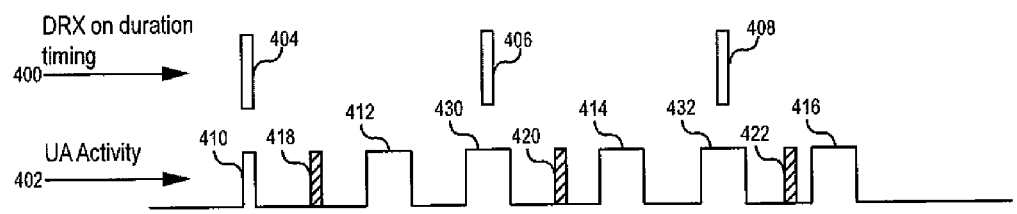
FIG. 4 is a timing diagram illustrating simultaneous operation of SPS and DRX in a UA, according to an embodiment of the disclosure.

FIG. 4 is a timing diagram illustrating simultaneous operation of SPS and DRX in a UA, according to an embodiment of the disclosure. The procedure shown in the timing diagram of FIG. 4 can be implemented in a UA, such as UA 102 of FIG. 1. Time moves along the direction shown by arrows 400 and 402, with times aligning along the various points of the timing diagrams. The timing diagrams shown in FIG. 4 represent an alternative embodiment, relative to FIG. 3, relating to the issues presented with respect to FIG. 2.

In the timing diagrams of FIG. 4, the UA is required to monitor the PDCCH during the configured downlink assignment, and to receive SPS transmissions using a configured DL assignment. Thus, according to one embodiment, the UA may receive its SPS transmissions even if the assignment does not align with the "on duration" time. Accordingly, the UA has an extra occasion to be active, and the UA ultimately receives more transmissions. This technique can also be implemented using the timing diagram shown in FIG. 3.

Arrow 400 shows the DRX "on duration" timing. Thus, each of time blocks 404, 406, and 408 show times that the DRX is "on duration." Note that the SPS and DRX timings are not aligned.

Arrow 402 shows the UA activity. Time blocks 410, 430, 432 show the active time during the DRX "on duration." Time blocks 412, 414, and 416 show the active time for potential retransmissions. At time blocks 418, 420, and 422, the UA is required to monitor the PDCCH during the configured downlink, and to receive SPS transmissions using a configured DL assignment. Thus, time blocks 418, 420, and 422 become active times. In this manner, the issues described with respect to FIG. 2 are appropriately addressed. Additionally, in an embodiment, the DRX retransmission timer can be started to allow for potential retransmission.

Accordingly, the UA monitors the PDCCH in a subframe to which a DL assignment is configured. This embodiment provides for extending section 5.7 of TS36.321 version 8.5.0, for example, such that the active time includes a subframe to which a DL assignment is configured, in addition to the other times defined in the specification.

In some embodiments, this embodiment might be preferred over the first embodiment described above (the UA using a configured DL assignment to receive SPS transmissions independent of the UA monitoring the PDCCH) because the network device, such as an access device, might be able to override the configured DL assignment with a dynamically scheduled DL assignment. The DL assignment may be signaled on the PDCCH. This result might be useful, such as where the network device has extra data to send to the UA, such as some ROHC (robust header compression) header context information or ROHC feedback. However, in the former embodiment (FIG. 3), the network device may not be able to override the configured DL assignment, and might have to send the additional data at the next "on duration" when the UA will be monitoring the PDCCH.

In the previous two embodiments (FIGS. 3 and 4), if the network device (such as an eNB) configures a DL assignment outside of the "on duration" period, the opportunity for DRX is reduced compared to the case where the configured resources are aligned with the DRX "on duration" period. For efficient UA battery usage, the DRX "start offset" could be adjusted to align when a DL assignment is configured or reconfigured. This embodiment is described with respect to FIG. 5, and may be implemented alone or in conjunction with the embodiments described with respect to FIGS. 3 and 4.

Figure 5:
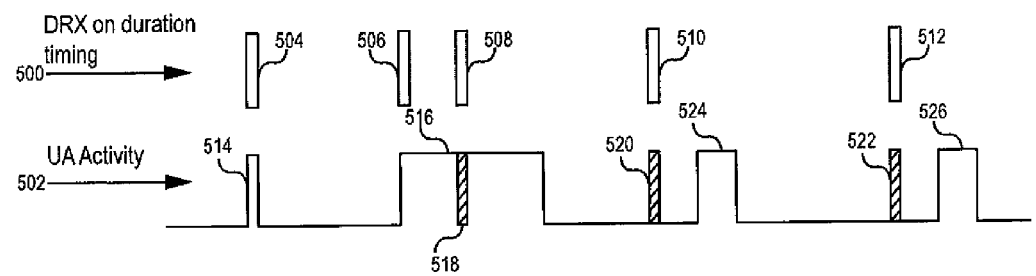
FIG. 5 is a timing diagram illustrating simultaneous operation of SPS and DRX in a UA, according to an embodiment of the disclosure.

FIG. 5 is a timing diagram illustrating simultaneous operation of SPS and DRX in a UA, according to an embodiment of the disclosure. The procedure shown in the timing diagram of FIG. 5 can be implemented in a UA, such as UA 102 of FIG. 1. Time moves along the direction shown by arrows 500 and 502, with times aligning along the various points of the timing diagrams. The timing diagrams shown in FIG. 5 represent an additional and/or supplemental embodiment, relative to FIGS. 3 and 4, relating to the issues presented with respect to FIG. 2.

In the embodiment shown in FIG. 5, the UA adjusts the DRX "start offset" when a DL assignment is configured or reconfigured. In other words, the UA adjusts the DRX "start offset" when a SPS is activated. In the embodiment shown in FIG. 5, at arrow 502, SPS is initially not activated.

Arrow 500 shows the DRX "on duration" timing. Thus, each of time blocks 504, 506, 508, 510, and 512 show times that the DRX is "on duration." Note that after the SPS is activated, the SPS and DRX timings are configured to be aligned.

Time block 514 represents the active time during the DRX "on duration." This first time block aligns with the DRX "on duration" time block 504.

At time block 516, the network device (access node or eNB) extends the active time beyond an expected time by sending data to the UA. At time block 518, the network device sends an SPS activation on the PDCCH using SPS-RNTI. At this time, as shown at time block 508, the UA adjusts its DRX timing to be aligned with timing of the SPS configured DL assignments. Accordingly, at time blocks 520 and 522, the DRX timing in the UA is aligned with the DRX "on duration" times at time blocks 510 and 512. Thus, the UA will receive SPS transmissions correctly. The UA's active times for potential retransmission occur at time blocks 524 and 526.

Because no additional information is required, compared with SPS reinitializing messages on the PDCCH, the probability of a false detection is the same as compared to the current SPS activation. Thus, if an error occurs, such as if the UA missed the message on the PDCCH, the network device can revert back to the old DRX "start offset" value for error handling. Additionally, in this embodiment, the automatic adjustment of the DRX cycle timing promotes SPS and DRX timing alignment.

This embodiment can be implemented by using the procedure described below along with the procedures currently proposed in section 5.10.1 of TS36.321 version 8.5.0. In combination with the present disclosure, it will be appreciated by one of ordinary skill in the art that backward compatibility ought to be considered. For example, in an embodiment, it may be undesirable for the UA to adjust the DRX start offset as disclosed herein when communicating with a legacy eNB, because legacy eNBs may not be expecting this adjustment, and because use of the DRX start offset adjustment procedure when communicating with a legacy eNB may result in the UA being unreachable by the legacy eNB. In an embodiment, an eNB designed to interoperate with the disclosed UA DRX start offset adjustment procedures may employ RRC signaling to activate UA adjustment of the DRX start offset. In another embodiment, the eNB may send a signal to activate UA adjustment of the DRX start offset by another method or another protocol. In some contexts, it may be said that the eNB and/or access node is configured to transmit a DRX start adjust procedure activation signal via a radio resource control (RRC) protocol, for example to transmit the DRX start adjust procedure activation signal via the RRC protocol to the UA.

If the DRX is configured, the UA may adjust the DRX "start offset" to satisfy the following conditions. If the Short DRX Cycle is used, then the DRX start offset may be governed by the equation [(10*SFNstart time+subframestart time)+N*(Downlink Semi-Persistent Scheduling Interval)] modulo (Short DRX Cycle)=(DRX start offset) modulo (Short DRX Cycle). However, if the Long DRX Cycle is used, then the DRX start offset may be governed by the equation [(10*SFNstart time+subframestart time)+N*(Downlink Semi-Persistent Scheduling Interval)] modulo (Long DRX Cycle)=DRX start offset. In the above equations, N is a positive integer.

Alternatively, in an embodiment, the DRX start offset may be reduced to shift the DRX slightly forward, to promote the SPS transmission being inside the DRX "on duration" period. This shift forward of the DRX Cycle may provide further flexibility for the access node packet scheduling function. If the Short DRX Cycle is used, then the DRX start offset may be governed by the equation [(10*SFNstart time+subframestart time)+N*(Downlink Semi-Persistent Scheduling Interval)] modulo (Short DRX Cycle)=(DRX start offset) modulo (Short DRX Cycle)+timingAdjust. However, if the Long DRX Cycle is used, then the DRX start offset may be governed by the equation [(10*SFNstart time+subframestart time)+N*(Downlink Semi-Persistent Scheduling Interval)] modulo (Long DRX Cycle)=(DRX start offset+timingAdjust). In the above equations, N is a positive integer and timingAdjust is a non-negative integer.

In an embodiment, the value of timingAdjust may be about one third the duration of the DRX "on duration" period. In another embodiment, the value of timingAdjust may be about one half the duration of the DRX "on duration" period. In an embodiment, timingAdjust may determined, for example, as timingAdjust=Ceiling[DRX"on duration"/x]

or timingAdjust=Floor[DRX"on duration"/x]

where x is a positive integer. In an embodiment, timingAdjust is less than the value of the DRX "on duration" time period. In another embodiment, the value of timingAdjust may be indicated by RRC protocol, for example carried along with a DRX start adjust procedure activation signal.

In another embodiment, where the UA adjusts DRX "start offset" to the configured uplink grant, the UA may adjust the DRX "start offset" to satisfy the following conditions. If the Short DRX Cycle is used, then the DRX start offset may be governed by the equation [(10*SFNstart time+subframestart time)+N*(Downlink Semi-Persistent Scheduling Interval)+Subframe_Offset*(N modulo 2)] modulo (Short DRX Cycle) =(DRX start offset) modulo (Short DRX Cycle). However, if the Long DRX Cycle is used, then the DRX start offset may be governed by the equation [(10*SFNstart time+subframestart time)+N (Downlink Semi-Persistent Scheduling Interval)+Subframe_Offset*(N modulo 2)] modulo (Long DRX Cycle)=DRX start offset. In the above equations, N is a positive integer.

Alternatively, in an embodiment, the DRX start offset may be reduced to shift the DRX slightly forward, to promote the SPS transmission being inside the DRX "on duration" period. This shift forward of the DRX Cycle may provide further flexibility for the access node packet scheduling function. If the Short DRX Cycle is used, then the DRX start offset may be governed by the equation [(10*SFNstart time+subframestart time)+N*(Downlink Semi-Persistent Scheduling Interval)+Subframe_Offset*(N modulo 2)] modulo (Short DRX Cycle)=(DRX start offset) modulo (Short DRX Cycle)+timingAdjust. However, if the Long DRX Cycle is used, then the DRX start offset may be governed by the equation [(10*SFNstart time+subframestart time)+N*(Downlink Semi-Persistent Scheduling Interval)+Subframe_Offset*(N modulo 2)] modulo (Long DRX Cycle)=(DRX start offset+timingAdjust). In the above equations, N is a positive integer and timingAdjust is a non-negative integer.

In an embodiment, the value of timingAdjust may be about one third the duration of the DRX "on duration" period. In another embodiment, the value of timingAdjust may be about one half the duration of the DRX "on duration" period. In an embodiment, timingAdjust may determined, for example, as $$\text{timingAdjust}=\text{Ceiling}[DRX\text{"on duration"}/x]$$

or $$\text{timingAdjust}=\text{Floor}[DRX\text{"on duration"}/x]$$

where x is a positive integer. In an embodiment, timingAdjust is less than the value of the DRX "on duration" time period. In another embodiment, the value of timingAdjust may be indicated by RRC protocol, for example carried along with a DRX start adjust procedure activation signal.

In an embodiment, if the DRX is configured, the UA may adjust the DRX "start offset" to satisfy the following equation: (10*SFNstart time+subframestart time) modulo (Long DRX Cycle)=DRX start offset. Alternatively, in an embodiment, the DRX "start offset" may be reduced to shift the DRX slightly forward, to promote the SPS transmission being inside the DRX "on duration" period. This shift forward of the DRX Cycle may provide further flexibility for the access node packet scheduling function. In this alternative embodiment, the UA may adjust the DRX "start offset" to satisfy the following equation: (10*SFNstart time+subframestart time) modulo (Long DRX Cycle)=(DRX start offset+timingAdjust). The appropriate range of values for the timingAdjust are discussed further above.

With regards to alignment between configured uplink grant and DRX cycle timing, the network device may align the configuration of the uplink grant to the DRX start offset or configured DL assignment by adjusting when to configure an uplink grant, in order to save UA battery consumption. This alignment may occur when a new talkspurt starts.

In a further embodiment expanding on the procedure described with respect to FIG. 5, the UA adjusting the "DRX start offset," the UA may monitor the PDCCH for the C-RNTI and SPS-RNTI during the "active time" to allow a change of DL assignment without restriction. Thus, for example, a change of DL assignment may take place outside the "on duration" period." In order to reduce false detection of SPS resource activation, or release over the PDCCH, the duration during which the UA monitors the PDCCH for its SPS-RNTI may be reduced. The network device may indicate a change in configuration of downlink assignment in advance by the PDCCH, MAC header, or MAC control element. If such an indication is signaled, the UA will detect its SPS-RNTI during the "active time" for a preconfigured duration. Otherwise, the UA will detect its SPS-RNTI only during the "on duration period."

In still another embodiment relative to FIGS. 3 through 5, the "on duration" timer may be started or restarted when a starting condition is satisfied. Alternatively, in still another embodiment relative to FIGS. 3 through 5, the "on duration" timer may be started or restarted when a starting condition is satisfied and when an on duration timer configuration activation signal is received via the radio resource control (RRC) protocol. This embodiment may be implemented in addition to any of the embodiments described with respect to FIGS. 3 through 5. This embodiment provides for appropriate DRX operation when the DRX "start offset" is adjusted as described above or reconfigured using RRC reconfiguration procedure.

Figure 6:
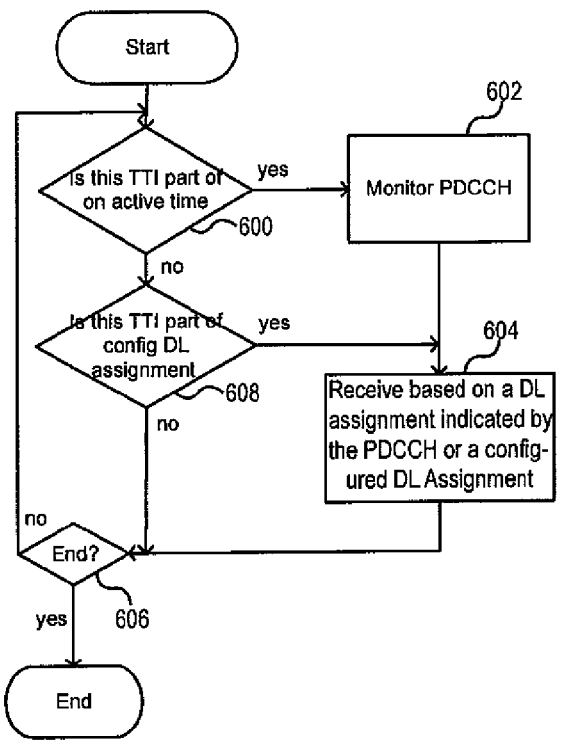
FIG. 6 is a flowchart illustrating a method of receiving using a configured DL assignment, according to an embodiment of the disclosure.

FIG. 6 is a flowchart illustrating a method of receiving using a configured DL assignment, according to an embodiment of the disclosure. The procedure shown in FIG. 6 can be implemented in a UA, such as UA 102 of FIG. 1.

The process begins by determining whether this TTI is part of an on active time (block 600). If yes, then the UA promotes monitoring of the PDCCH (block 602). The UA then promotes receiving based on a downlink assignment indicated by the PDCCH or a configured DL assignment (block 604). The UA then determines whether to terminate (block 606).

If the process is not to terminate, then the process returns to block 600. If the determination at block 600 was "no", then the UA promotes determining whether this TTI is part of a configured DL assignment (block 608). If yes, then the process moves to block 604 and proceeds as described above. If not, then the UA again determines whether to end at block 606.

Figure 7:
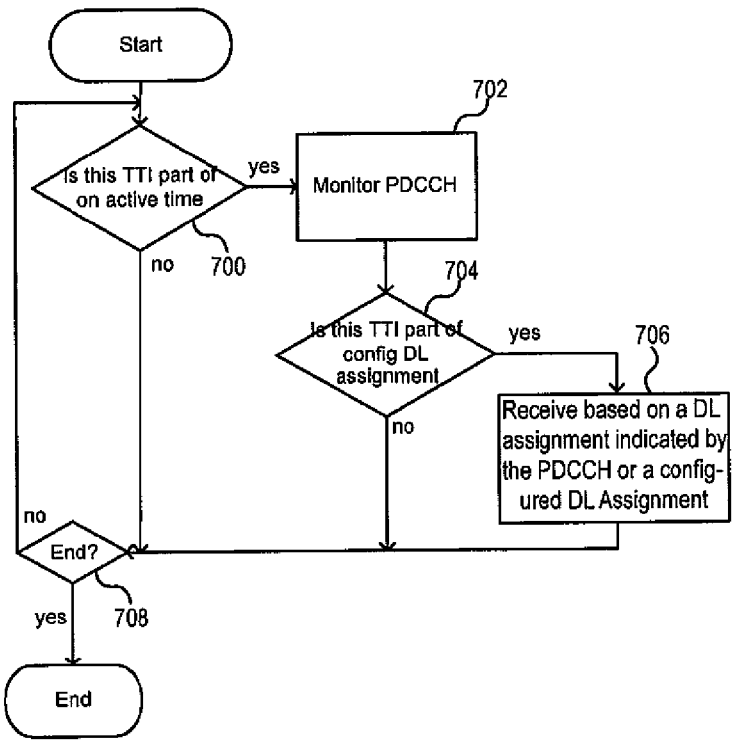
FIG. 7 is a flowchart illustrating a method of receiving using a configured DL assignment, according to an embodiment of the disclosure.

FIG. 7 is a flowchart illustrating a method of receiving using a configured DL assignment, according to an embodiment of the disclosure. The procedure shown in FIG. 7 can be implemented in a UA, such as UA 102 of FIG. 1.

The process begins by determining whether this TTI is part of an on active time (block 700). If so, then the UA promotes monitoring of the PDCCH (block 702). The UA then promotes determining whether this TTI is part of a configured DL assignment (block 704). If so, then the UA promotes receiving based on a downlink assignment indicated by the PDCCH or a configured DL assignment (block 706).

Thereafter, or after a "no" determination at either block 700 or block 704, the UA determines whether to end (block 708). If the process should continue, then the process returns to step 700 and repeats. Otherwise, the process terminates.

FIG. 8 is a flowchart illustrating a method of adjusting DRX timing and receiving using a configured DL assignment, according to an embodiment of the disclosure. The procedure shown in FIG. 8 can be implemented in a UA, such as UA 102 of FIG. 1.

The process begins by determining whether this TTI is part of an on active time (block 800). If so, then the UA promotes monitoring of the PDCCH (block 802). The UA then promotes determining whether the PDCCH indicates an SPS activation (block 804). If so, then the UA promotes a change in DRX timing such that it is aligned with the configured DL assignment received in the SPS activation (block 806).

Thereafter, or after a "no" determination at block 804, the UA promotes determining whether this TTI is part of a configured DL assignment. If so, then the UA promotes receiving based on a downlink assignment indicated by the PDCCH or a configured DL assignment (block 810).

Thereafter, or after a "no" determination at either of blocks 800 or 808, the UA determines whether to end (block 812). If the process should continue, then the process returns to step 800 and repeats. Otherwise, the process terminates.

FIG. 9 is a flowchart illustrating a method of adjusting DRX timing and receiving using a configured DL assignment, according to an embodiment of the disclosure. The procedure shown in FIG. 9 can be implemented in a UA, such as UA 102 of FIG. 1.

The process begins as the UA determines if this TTI is part of an on active time (block 900). If so, then the UA monitors the PDCCH (block 902). The UA then determines whether the PDCCH indicates a downlink assignment (block 904).

If the PDCCH does indicate a DL assignment, then the UA receives according to the DL assignment indicated on the PDCCH (block 906). Thereafter, the UA determines whether to end the process (block 916). If the process does not end, then the process returns to step 900 and repeats. Otherwise, the process terminates.

Returning to block 904, if the PDCCH does not indicate a DL assignment, then the UA further determines whether the PDCCH indicates an SPS assignment (block 908). If the PDCCH does indicate a SPS assignment, then the UA changes the DRX timing to be aligned with the configured DL assignment received in the SPS activation (block 910). Thereafter, or after a "no" determination at block 908, the UA determines whether to end the process. If the process does not end, then the process returns to step 900 and repeats. Otherwise, the process terminates.

Returning to block 900, if this TTI is not part of an on active time, then the UA makes a determination whether this TTI is part of a configured downlink assignment (block 912). If this TTI is part of a configured DL assignment, then the UA receives using the configured DL assignment (block 914). Thereafter, or after a "no" determination at block 912, the UA determines whether to end the process. If the process does not end, then the process returns to step 900 and repeats. Otherwise, the process terminates.

FIGS. 10 through 13 illustrate exemplary methods for implementing the embodiments described above. In each of the methods shown in FIGS. 10 through 13, the corresponding method can be implemented in a UA or an eNB, such as UA 102 of FIG. 1. Each of these methods relate to addressing a situation in which the UA receives a configured downlink assignment outside of an active time, as shown in FIG. 2.

Figure 10:
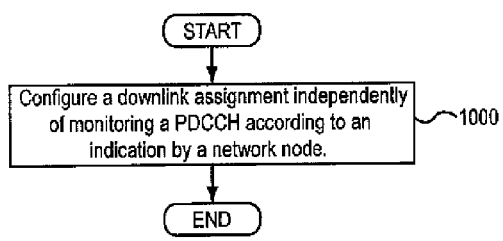
FIG. 10 is a flowchart illustrating a method of configuring a configured downlink assignment, according to an embodiment of the disclosure.

In particular, FIG. 10 is a flowchart illustrating a method of configuring a downlink assignment, according to an embodiment of the disclosure. The UA configures a downlink assignment independently of monitoring a physical downlink control channel according to indication by a network node, such as an eNB (block 1000).

Figure 11:
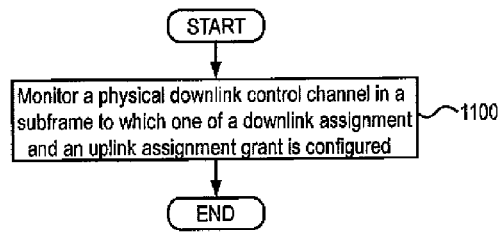
FIG. 11 is a flowchart illustrating a method of monitoring a physical downlink control channel (PDCCH), according to an embodiment of the disclosure.

FIG. 11 is a flowchart illustrating a method of monitoring a physical downlink control channel (PDCCH), according to an embodiment of the disclosure. The UA monitors a PDCCH in a subframe to which one of a downlink assignment and an uplink assignment grant is configured (block 1100).

Figure 12:
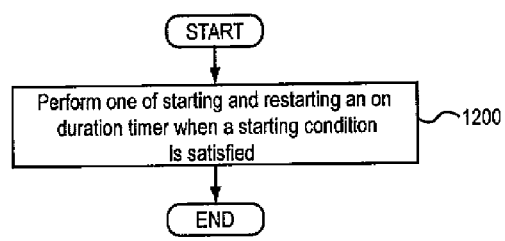
FIG. 12 is a flowchart illustrating a method of starting or restarting an on duration timer, according to an embodiment of the disclosure.

FIG. 12 is a flowchart illustrating a method of starting or restarting an on duration timer, according to an embodiment of the disclosure. The UA performs one of starting and restarting an "on duration timer" when a starting condition is satisfied (block 1200). In an alternative embodiment, the UA performs one of starting and restarting an "on duration timer" when a starting condition is satisfied and when a DRX start adjust procedure activation signal is received, for example received via a radio resource control (RRC) protocol.

Figure 13:
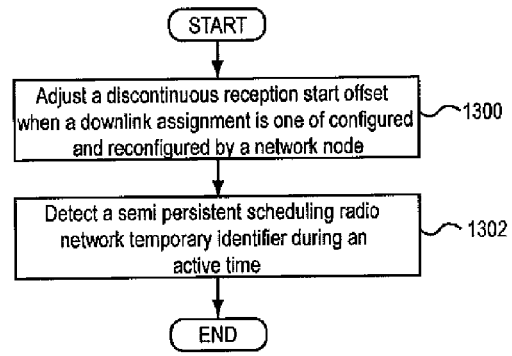
FIG. 13 is a flowchart illustrating a method of adjusting a discontinuous reception (DRX) start offset, according to an embodiment of the disclosure.

FIG. 13 is a flowchart illustrating a method of adjusting a discontinuous reception (DRX) start offset, according to an embodiment of the disclosure. The UA adjusts a DRX start offset when a downlink assignment is one of configured and reconfigured by a network node, such as an eNB (block 1300). Optionally, the UA may detect a SPS-RNTI during an active time (block 1302). In an embodiment, the behavior depicted in FIG. 13 may be contingent on receiving a DRX start adjust procedure activation signal, for example, but not by way of limitation, received via a radio resource control (RRC) protocol. In an alternative embodiment, the UA activates a DRX start adjust procedure when a DRX start adjust procedure activation signal is received by the UA, for example when the UA receives the DRX start adjust procedure activation signal via a radio resource control (RRC) protocol.

In some cases the UA may falsely detect the activation of a SPS mode when decoding the PDCCH and store the configured downlink assignment, for example when the UA receives the PDCCH in error and the CRC of the PDCCH agrees with the errored reception. In some circumstances, for example, the false detection may be due to the limited length of the CRC on the PDCCH. Because the frequency resource indicated by the falsely detected SPS activation from which the UA receives and attempts to decode would be random, the decoding of the PDSCH subframes defined by the false configured downlink assignment will fail considering the sufficient length of CRC (24 bits) is used for PDSCH transmission. As a result, the UA will transmit NACKs consecutively. In other circumstances, however, other conditions may result in and/or cause the false detection by the UA of the activation of the SPS mode.

In one embodiment, rather than adjusting the DRX "start offset" immediately when the UA detects activation of the SPS mode, as discussed above with reference to FIG. 5, the UA may wait to adjust the DRX "start offset" until the UA successfully decodes the one or more SPS transmissions on the PDSCH associated with the configured downlink assignment, thereby confirming that the SPS activation was not received in error. In an embodiment, after the UA successfully decodes one or more SPS transmissions on the PDSCH associated with the configured downlink assignment within a number M downlink SPS intervals after the subframe in which the UA receives the SPS activation command and stores the configured downlink assignment for SPS transmissions, the UA may conclude that the SPS activation was properly detected and may perform processing going forwards on that assumption. In another embodiment, after the UA successfully decodes either one or more SPS transmissions on the PDSCH associated with the configured downlink assignment or one or more SPS retransmissions on the PDSCH which are dynamically assigned by the PDCCH within a number M downlink SPS intervals after the subframe in which the UA receives the SPS activation command and stores the configured downlink assignment for SPS transmissions, the UA may conclude that the SPS activation was properly detected and may perform processing going forwards on that assumption. For example, in an embodiment, the UA may adjust the DRX "start offset" to coincide with the SPS at the last subframe of the Mth downlink SPS interval after the subframe in which the UA receives the SPS activation command and stores the configured downlink assignment. In an embodiment the eNB may conclude that SPS activation is successful and may perform processing going forwards on that assumption if one or more ACKs response to SPS transmissions or SPS retransmissions are received within the M downlink SPS intervals after the subframe in which the eNB transmits the SPS activation command. For example, in an embodiment, the eNB may adjust the DRX "start offset" to coincide with the SPS at the last subframe of the Mth downlink SPS interval after the subframe in which the eNB transmits the SPS activation command. In an embodiment, the number M may one of two, three, and four. In another embodiment, the number M may be in the range from four to ten. In yet another embodiment, the number M may be another value. In yet another embodiment, M may be specified in number of subframes. For example, M is N*(downlink SPS interval in subframe) where N may be a positive integer. M may be a predefined value or may be signaled by RRC.

In another embodiment, the UA may adjust the DRX "start offset" immediately when the UA detects activation of the SPS mode (but detects SPS activation in error, for example because of a low received signal strength, because of radio interference, or because of some other impairment of transmission, reception, and/or propagation), as discussed above with reference to FIG. 5. After the UA detects a number N consecutive failed decodings of the SPS transmissions on the PDSCH associated with the configured downlink assignment, the UA may conclude that the SPS activation was falsely detected and perform processing going forwards on that assumption. In another embodiment after the UA detects a number N consecutive failed decodings of either the SPS transmissions on the PDSCH associated with the configured downlink assignment or the SPS retransmissions on the PDSCH dynamically assigned by PDCCH, the UA may conclude that the SPS activation was falsely detected and perform processing going forwards on that assumption. In another embodiment, after UA does not decode any SPS transmissions on PDSCH associated with the configured downlink assignment within a certain duration M after the subframe in which the UA receives the SPS activation and stores the configured downlink assignment, the UA may conclude that the SPS activation was falsely detected and perform processing going forwards on that assumption. For example the duration may be in a number of subframes or a number of downlink SPS intervals. In yet another embodiment, after UA does not decode any of either SPS transmissions on the PDSCH associated with the configured downlink assignment or SPS retransmissions on the PDSCH dynamically assigned by PDCCH within a certain duration M after the subframe in which the UA receives the SPS activation and stores the configured downlink assignment, the UA may conclude that the SPS activation was falsely detected and perform processing going forwards on that assumption. For example the duration may be in a number of subframes or a number of downlink SPS intervals or a predefined time duration. For example, in an embodiment, if the UA reaches a conclusion that the SPS activation was falsely detected, the UA may revert to the DRX timing before adopting the DRX "start offset" as described with reference to FIG. 5 above. In an embodiment, the number N may be one of one, two, and three. In another embodiment, the number N may be between four and ten, inclusive of four and ten. In yet another embodiment, the number N may be between eleven and twenty, inclusive of eleven and twenty. In another embodiment, the number N may be another value. N may be a predefined value or may be signaled by RRC. In an embodiment M may one of two, three, and four downlink SPS intervals. In another embodiment, the number M may be in the range from four to ten. In yet another embodiment, the number M may be another value. In yet another embodiment, M may be specified in number of subframes. For example, M is N*(downlink SPS interval in subframe) where N may be a positive integer. M may be a predefined value or may be signaled by RRC.

In another embodiment, the eNB may determine that the UA has falsely detected activation of the SPS mode, for example by determining that the UA repeatedly transmits consecutive NACKs. The uplink resource for HARQ feedback to SPS transmission is configured by RRC. Therefore the eNB may be able to identify the UA consecutively transmitting NACKs by the uplink resources used to transmit the NACKs if a single PUCCH resource index is used for SPS configuration. If multiple PUCCH resource indexes are used for a UA, the eNB may identify multiple UAs. In an embodiment, the eNB may remedy the false detection of the SPS activation by the UA by transmitting an SPS activation message to the UA or multiple UAs within the Active Time which can be calculated by the time when the NACKs are received in order to correct the misbehavior resulting from the false detection by the UA of the SPS activation. In an embodiment, the eNB may determine that a number N consecutive NACKs received from the UA indicates the UA has falsely detected activation of the SPS mode. In an embodiment, the number N may be one of one, two, three, and four. In another embodiment, the number N may be in the range from four to ten, inclusive of four and ten. In yet another embodiment, the number N may be some other value. The embodiments described in this paragraph also can be applied to remedy the case where the SPS activation was correctly received by the UA, and the UA changes the DRX "start offset," but the eNB fails to receive ACK or NACK from the UA and maintains the current DRX "start offset."

Another error may occur in the SPS activation: in some circumstances, the eNB may activate the SPS mode via the PDCCH, but the UA may fail to receive the activation, the eNB erroneously detects ACK or NACK and starts scheduling subsequent SPS transmissions. In this circumstance, the eNB may detect this condition by observing that the UA does not provide any HARQ feedbacks—neither ACKs or NACKS. The eNB may conclude, on this basis, that the UA has not activated the SPS mode, and the eNB may retransmit the SPS activation during the DRX period based on the already configured DRX "start offset." In an embodiment, the eNB may conclude that the UA has not activated the SPS mode after receiving no HARQ feedback from the UA for a number M consecutive subframe transmissions to the UA. In an embodiment, the number M may be one of one, two, three, and four. In another embodiment, the number M may be in the range from five to ten, inclusive of five and ten. In yet another embodiment, some M may be some other number.

Figure 14:
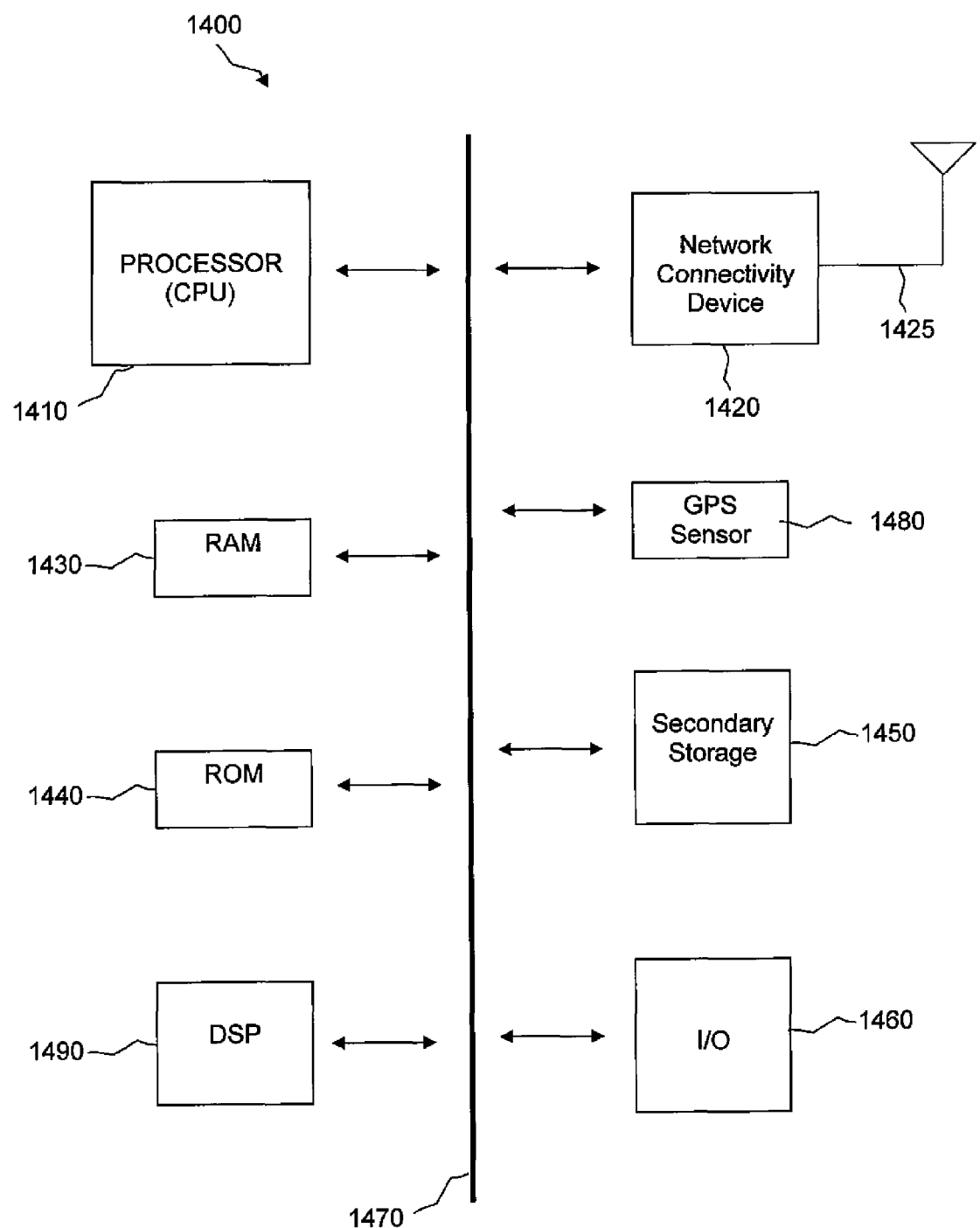
FIG. 14 illustrates a processor and related components suitable for implementing the several embodiments of the present disclosure.

The UA and other components described above might include a processing component that is capable of executing instructions related to the actions described above. FIG. 14 illustrates an example of a system 1400 that includes a processing component 1410 suitable for implementing one or more embodiments disclosed herein. In addition to the processor 1410 (which may be referred to as a central processor unit or CPU), the system 1400 might include network connectivity devices 1420, random access memory (RAM) 1430, read only memory (ROM) 1440, secondary storage 1450, and input/output (I/O) devices 1460. These components might communicate with one another via a bus 1470. In some cases, some of these components may not be present or may be combined in various combinations with one another or with other components not shown. These components might be located in a single physical entity or in more than one physical entity. Any actions described herein as being taken by the processor 1410 might be taken by the processor 1410 alone or by the processor 1410 in conjunction with one or more components shown or not shown in the drawing, such as a digital signal processor (DSP) 1490. Although the DSP 1490 is shown as a separate component, the DSP 1490 might be incorporated into the processor 1410.

The processor 1410 executes instructions, codes, computer programs, or scripts that it might access from the network connectivity devices 1420, RAM 1430, ROM 1440, or secondary storage 1450 (which might include various disk-based systems such as hard disk, floppy disk, or optical disk). While only one CPU 1410 is shown, multiple processors may be present. Thus, while instructions may be discussed as being executed by a processor, the instructions may be executed simultaneously, serially, or otherwise by one or multiple processors. The processor 1410 may be implemented as one or more CPU chips.

The network connectivity devices 1420 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1420 may enable the processor 1410 to communicate with the Internet or one or more telecommunications networks or other networks from which the processor 1410 might receive information or to which the processor 1410 might output information. The network connectivity devices 1420 might also include one or more transceiver components 1425 capable of transmitting and/or receiving data wirelessly.

The RAM 1430 might be used to store volatile data and perhaps to store instructions that are executed by the processor 1410. The ROM 1440 is a non-volatile memory device that typically has a smaller memory capacity than the memory capacity of the secondary storage 1450. ROM 1440 might be used to store instructions and perhaps data that are read during execution of the instructions. Access to both RAM 1430 and ROM 1440 is typically faster than to secondary storage 1450. The secondary storage 1450 is typically comprised of one or more disk drives or tape drives and might be used for non-volatile storage of data or as an over-flow data storage device if RAM 1430 is not large enough to hold all working data. Secondary storage 1450 may be used to store programs that are loaded into RAM 1430 when such programs are selected for execution.

The I/O devices 1460 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1425 might be considered to be a component of the I/O devices 1460 instead of or in addition to being a component of the network connectivity devices 1420.

The following are incorporated herein by reference for all purposes: 3rd Generation Partnership Project (3GPP) Technical Specification (TS) 24.008, 25.331, 36.321, 36.33, 36.211, R2-086815 "Clarification of DRX Active Time" Ericsson, InterDigital, Nokia, NSN, Sunplus, as well as R2-090820 "RRC Processing Delay" Qualcomm.

U.S. provisional patent application Ser. No. 61/162,594 filed Mar. 23, 2009, by Takashi Suzuki et al., entitled "Discontinuous Reception and Semi-Persistent Scheduling and Alignment System and Method" is hereby incorporated by reference for all purposes.

In an embodiment, a user agent is disclosed. The user agent comprises a processor enabled to configure the user agent to adjust a discontinuous reception (DRX) start offset when a downlink assignment is one of configured and reconfigured. The DRX start offset is adjusted to satisfy the equation:

$$(10*SFNstart\ time+subframestart\ time) modulo(Long\ DRX\ Cycle)=DRX\ start\ offset$$

In another embodiment, a user agent is disclosed. The user agent comprises a processor enabled to configure the user agent to adjust a discontinuous reception (DRX) start offset when a downlink assignment is one of configured and reconfigured. The DRX start offset is adjusted to satisfy the equation:

$$(10*SFNstart\ time+subframestart\ time) modulo(Long\ DRX\ Cycle)=DRX\ start\ offset+timingAdjust$$

In another embodiment, a method implemented in a user agent is disclosed. The method comprises adjusting a discontinuous reception (DRX) start offset when a downlink assignment is one of configured and reconfigured. The DRX start offset is adjusted to satisfy the equation:

$$(10*SFNstart\ time+subframestart\ time) modulo(Long\ DRX\ Cycle)=DRX\ start\ offset$$

In another embodiment, a method implemented in a user agent is disclosed. The method comprises adjusting a discontinuous reception (DRX) start offset when a downlink assignment is one of configured and reconfigured. The DRX start offset is adjusted to satisfy the equation:

$$(10*SFNstart\ time+subframestart\ time) modulo(Long\ DRX\ Cycle)=DRX\ start\ offset+timingAdjust$$

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:
1. A user agent, comprising:
a storage device comprising instructions executable by a processor, the instructions configured such that when executed, cause the processor to adjust a discontinuous reception (DRX) start offset when a semi-persistent scheduling (SPS) downlink assignment is configured or reconfigured, the DRX start offset adjusted to promote using the downlink assignment during DRX operation, wherein the DRX start offset is adjusted such that SPS transmissions align in time with an "on duration" of a DRX cycle.

2. The user agent of claim 1, wherein the user agent is configured to monitor a physical downlink control channel (PDCCH) during the "duration" of each DRX cycle.

3. The user agent of claim 2, wherein the DRX start offset is adjusted to satisfy the equation:

(10*SFNstart time+subframestart time)modulo(Long DRX Cycle)=DRX start offset+timingAdjust, where SFNstart time corresponds to a system frame number (SFN).

4. The user agent of claim 3, where the value of timingAdjust is less than or equal to one half of the DRX "on duration".

5. The user agent of claim 2, wherein the user agent is configured to detect a SPS radio network temporary identifier (RNTI) during one of the "on duration" or an active time in which the user agent monitors a physical downlink control channel (PDCCH).

6. The user agent of claim 5, wherein the user agent only attempts detecting the SPS RNTI during the "on duration" unless the user agent receives an indication from an access node to monitor the PDCCH during the active time for a preconfigured duration.

7. A method implemented in a user agent, the method comprising:
adjusting a discontinuous reception (DRX) start offset when a semi-persistent scheduling (SPS) downlink assignment is configured or reconfigured, the DRX start offset adjusted to promote using the downlink assignment during DRX operation,
wherein the DRX start offset is adjusted such that SPS transmissions align in time with an "on duration" of a DRX cycle.

8. The method of claim 7, wherein the user agent is configured to monitor a physical downlink control channel (PDCCH) during the "on duration" of each DRX cycle.

9. The method of claim 8, wherein the DRX start offset is adjusted to satisfy the equation:

(10*SFNstart time+subframestart time)modulo(Long DRX Cycle)=DRX start offset+timingAdjust, where SFNstart time corresponds to a system frame number (SFN).

10. The method of claim 9, where the value of timingAdjust is less than or equal to one half of the DRX "on duration".

11. The method of claim 8, further comprising attempting to detect a SPS radio network temporary identifier (RNTI) during one of the "on duration" or an active time in which the user agent monitors a physical downlink control channel (PDCCH).

12. The method of claim 11, wherein the user agent only attempts detecting the SPS RNTI during the "on duration" unless the user agent receives an indication from an access node to monitor the PDCCH during the active time for a preconfigured duration.

13. The non-transitory computer medium storing computer readable instructions executable by a processor to implement a method in a user agent, the method comprising:
adjusting a discontinuous reception (DRX) start offset when a semi-persistent scheduling (SPS) downlink assignment is configured or reconfigured, the DRX start offset adjusted to promote using the downlink assignment during DRX operation,
wherein the DRX start offset is adjusted such that SPS transmissions align in the with an "on duration" of a DRX cycle.

14. The non-transitory computer medium of claim 13, wherein the user agent is configured to monitor a physical downlink control channel (PDCCH) during the "on duration" of each DRX cycle.

15. The non-transitory computer medium of claim 14, wherein the DRX start offset is adjusted to satisfy the equation:

(10*SFNstart time+subframestart time)modulo(Long DRX Cycle)=DRX start offset+timingAdjust, where SFNstart time corresponds to a system frame number (SFN).

16. The non-transitory computer medium of claim 15, where the value of timingAdjust is less than or equal to one half of the DRX "on duration".

17. The non-transitory computer medium of claim 14, wherein the method further comprises attempting to detect a SPS radio network temporary identifier (RNTI) during one of the "on duration" or an active time in which the user agent monitors a physical downlink control channel (PDCCH).

18. The non-transitory computer medium of claim 17, wherein the user agent only attempts detecting the SPS RNTI during the "on duration" unless the user agent receives an indication from an access node to monitor the PDCCH during the active time for a preconfigured duration.

19. The user agent of claim 2, wherein the user agent does not monitor the PDCCH outside the "on duration" unless the user agent receives an indication from an access node to monitor the PDCCH for a preconfigured duration.

20. The user agent of claim 1, wherein the DRX start offset is adjusted to ensure that the downlink assignment periodically recurs in subframes coinciding with the "on duration" of each DRX cycle, and wherein the user agent is configured to use the downlink assignment for SPS transmissions in the subframes coinciding with the "on duration" of each DRX cycle.

* * * * *

UNITED STATES PATENT AND TRADEMARK OFFICE
CERTIFICATE OF CORRECTION

PATENT NO. : 9,185,738 B2
APPLICATION NO. : 14/280273
DATED : November 10, 2015
INVENTOR(S) : Takashi Suzuki et al.

Page 1 of 1

It is certified that error appears in the above-identified patent and that said Letters Patent is hereby corrected as shown below:

IN THE CLAIMS

Claim 2, Column 19, Line 8 replace "the "duration" of" with --the "on duration" of--

Claim 13, Column 20, Line 6 replace "The non-transitory" with --A non-transitory--

Claim 13, Column 20, Line 15 replace "the" with --time--

Signed and Sealed this
First Day of March, 2016

Michelle K. Lee
*Director of the United States Patent and Trademark Office*